(12) United States Patent
Baumgarte et al.

(10) Patent No.: US 10,682,801 B2
(45) Date of Patent: Jun. 16, 2020

(54) MOLD CARRIER FOR RECEIVING A MOLD FOR FORMING HOLLOW ARTICLES FROM PARISONS

(71) Applicant: KHS Corpoplast GmbH, Hamburg (DE)

(72) Inventors: Rolf Baumgarte, Ahrensburg (DE); Michael Linke, Hamburg (DE)

(73) Assignee: KHS Corpoplast GmbH, Hamburg (DE)

( * ) Notice: Subject to any disclaimer, the term of this patent is extended or adjusted under 35 U.S.C. 154(b) by 75 days.

(21) Appl. No.: 16/303,034

(22) PCT Filed: May 16, 2017

(86) PCT No.: PCT/EP2017/000592
§ 371 (c)(1),
(2) Date: Nov. 19, 2018

(87) PCT Pub. No.: WO2017/198333
PCT Pub. Date: Nov. 23, 2017

(65) Prior Publication Data
US 2019/0283308 A1 Sep. 19, 2019

(30) Foreign Application Priority Data
May 19, 2016 (DE) .................. 10 2016 006 211

(51) Int. Cl.
*B29C 49/56* (2006.01)
*B29C 49/48* (2006.01)
(Continued)

(52) U.S. Cl.
CPC .............. *B29C 49/56* (2013.01); *B29C 49/48* (2013.01); *B29C 49/06* (2013.01);
(Continued)

(58) Field of Classification Search
CPC ............ B29C 49/56; B29C 2049/4856; B29C 49/563
See application file for complete search history.

(56) References Cited

U.S. PATENT DOCUMENTS 3,685,943 A 8/1972 Fischer
6,805,548 B1 10/2004 Evrard
(Continued)

FOREIGN PATENT DOCUMENTS

DE 202004017530 U1 3/2005
DE 102010022130 A1 11/2011
JP 2002544017 A 12/2002

*Primary Examiner* — Robert B Davis
(74) *Attorney, Agent, or Firm* — Rankin, Hill & Clark LLP

(57) ABSTRACT

A device including a drive mechanism and a mold carrier that is divided into a first part (3a) and a second part (3b) which are configured to hold a respective section (2a, 2b) of a mold for forming a hollow container from a parison through the introduction of a gaseous or liquid pressurized medium under pressure into the parison. The first part (3a) is connected to the drive mechanism (6) by a first part connection region (7a) and is rotatable by the drive mechanism about an axis of rotation (A) such that the first part and the second part are transitionable between an open position and a closed position relative to each other. The first part connection region passes through a protective wall (8) that is arranged between and separates the mold carrier from the drive mechanism and thereby protects the drive mechanism against contamination on the mold carrier side.

9 Claims, 3 Drawing Sheets

(51) Int. Cl.
 *B29L 31/00* (2006.01)
 *B29C 49/06* (2006.01)
(52) U.S. Cl.
 CPC ............... *B29C 2049/4856* (2013.01); *B29C 2049/563* (2013.01); *B29L 2031/7158* (2013.01)

(56) References Cited

U.S. PATENT DOCUMENTS

| | | | |
|---|---|---|---|
| 2004/0104517 A1* | 6/2004 | Kronseder | B29C 49/56 264/523 |
| 2009/0039567 A1 | 2/2009 | Linke et al. | |
| 2010/0203185 A1 | 8/2010 | Litzenberg et al. | |
| 2011/0287126 A1 | 11/2011 | Geltinger et al. | |
| 2012/0070522 A1* | 3/2012 | Voth | B29C 49/46 425/88 |
| 2013/0115326 A1 | 5/2013 | Zacche' | |

\* cited by examiner

MOLD CARRIER FOR RECEIVING A MOLD FOR FORMING HOLLOW ARTICLES FROM PARISONS

BACKGROUND OF INVENTION

Field of Invention

The invention relates to a mold carrier for receiving a mold for forming hollow articles from parisons.

Brief Description of Related Art

Hollow articles, in particular containers such as bottles, today are often formed from a parison made of a thermoplastic synthetic material using a blow molding process inside a closed form. During this process, the parison, which could consist of PET, for example, first is heated such that it becomes plastic and then is inserted into a mold, which corresponds to the shape of the container to be formed.

The mold usually is divided into two parts along a vertical separation plane parallel to the symmetry axis of the container to be formed, such that the mold can be opened for removing the completely formed container. The mold parts may enclose the bottom portion of the completely formed container, or a separate mold may be used to form the bottom portion, which is irrelevant with regards to the invention to be described here. In the context of this application, the mold will be referred to as comprising two parts, even if the mold could comprise other parts irrelevant to the invention, such as a bottom portion mold.

The mold is inserted into a mold carrier, which includes two parts moveable in relation to each other, such that the mold can be transitioned from an open into a closed position.

The forming of the container is conducted after the insertion of the parison into the mold by introducing a pressurized medium into the parison, wherein the pressurized medium can be gaseous or liquid. When a gaseous medium is used in the classic blow molding process, a container is formed, which can be filled during the next step, if applicable. When a liquid pressurized medium is used in hydraulic container molding, the filling product can be used as the pressurized medium, such that a filled container, such as a water bottle, can be produced in a single operation. Both alternatives are covered by this application, as the invention described in the following can be applied to both processes. However, the advantages of the invention are particularly prominent in hydraulic molding.

During the forming of the container, the pressurized medium is introduced into the parison at high pressure, whereby the parison is stretched axially and radially, possibly with the help of a stretching rod, such that the material conforms to the interior surface of the mold and forms the container.

During the simultaneous hydraulic forming and filling of containers with filling product as a filling medium, it is possible for filling product to be spilled, as droplets may form when the filling head is placed on the parison and/or when formed and filled containers are removed. Particularly the filling of carbonated filling product may cause the filling product to foam, which may cause the container to overflow after the pressure is relieved. Furthermore, it is always possible for a container to burst during the forming and filling process.

Regular, thorough cleaning of the mold is necessary for hygiene reasons, in particular when filling product has spilled. It is desirable for the cleaning process to be conducted simply and quickly. If the drive mechanism of the moveable mold carrier is contaminated during a spill, the cleaning process becomes more elaborate and difficult. This would require a longer and therefore more expensive downtime of the machine than would be required if only the predominantly smooth and easily cleanable surfaces of the mold and the mold carrier would have to be cleaned.

BRIEF SUMMARY OF THE INVENTION

The object of the invention therefore is to propose a mold carrier for receiving a mold for forming hollow articles, wherein the drive mechanism of the mold carrier can be reliably protected from contamination by filling product.

According to the invention, the object is achieved by a mold carrier for receiving a mold for forming hollow articles from parisons, in particular for forming containers, by means of a gaseous or liquid pressurized medium introduced under pressure into the parison, the mold carrier being divided vertically and at least one part of the mold carrier being rotatably mounted about an axis of rotation, such that the two parts can be transitioned from an open position to a closed position by means of a drive mechanism. The mold carrier and the drive mechanism are mutually spaced horizontally and are connected by a connection region, which passes through a vertical separation plane. The mold carrier according to the invention is characterized in that a protective wall is arranged in the separation plane.

In this context, the terms vertical and horizontal relate to the typical arrangement of a mold carrier on the forming wheel or, respectively, the forming and filling wheel of a machine for forming or forming and filling containers from parisons. In such machines, the processing wheels typically are arranged in a horizontal plane and rotate about a vertical axis. The mold is divided vertically; the mold carrier therefore has to be divided vertically as well. The moveable parts of the mold carrier therefore typically are rotatably mounted about a vertical axis.

At least one part of the vertically divided mold carrier is rotatably mounted and driven by a drive mechanism. It is also possible for both parts of the mold carrier to be rotatably mounted, specifically either about their own respective rotational axes or about a mutual rotational axis.

The drive mechanism should be spaced apart from the mold carrier. Herein, a connection region should connect the actual mold carrier with the drive mechanism.

This connection region passes an initially virtual vertical separation plane, such that the actual mold carrier is located on one side of the separation plane and the drive mechanism on the other side.

According to the invention, a protective wall should be arranged in the separation plane. The protective wall separates the drive mechanism from the mold carrier and the mold. If filling product is spilled in the mold area, the filling product will not contaminate the drive mechanism.

The protective wall preferably is designed such that it protects the drive mechanism in its full vertical extent. Spilled filling product can drain downward along the protective wall without being able to make contact with the drive mechanism.

Preferably, the protective wall is nearly liquid tight in the connection region between the mold carrier and the drive mechanism. Even a rudimentary screening of the drive mechanism may be sufficient, as the protective wall essentially only needs to protect the mechanism from small amounts of spilled filling product.

The sealing off of the protective wall against the mold carrier can be realized by elastic bellows or lip seals.

The separation plane preferably may comprise the rotational axis or the rotational axes of the rotatable part or parts of the mold carrier.

The curvature radius of the surfaces of the connection region of the mold carrier in the separation plane thereby preferably corresponds to their distance from the rotational axis of the respective mold carrier part. When the mold carrier parts are rotated, the position of the surface within the separation plane does not change, such that the opening in the protective wall can be designed very narrow and can be sealed with little material and effort.

BRIEF DESCRIPTION OF THE DRAWINGS

In the following, an exemplary embodiment of the invention is explained in more detail on the basis of the attached drawings, in which.

All drawings merely serve to illustrate the principle of the invention. They represent simplifications in some instances and only comprise the components necessary for the illustration of the invention. A person skilled in the art could easily change the size of individual components relative to each other or adjust the respective sizes according to specific requirements.

DETAILED DESCRIPTION OF THE INVENTION

Figure 1:
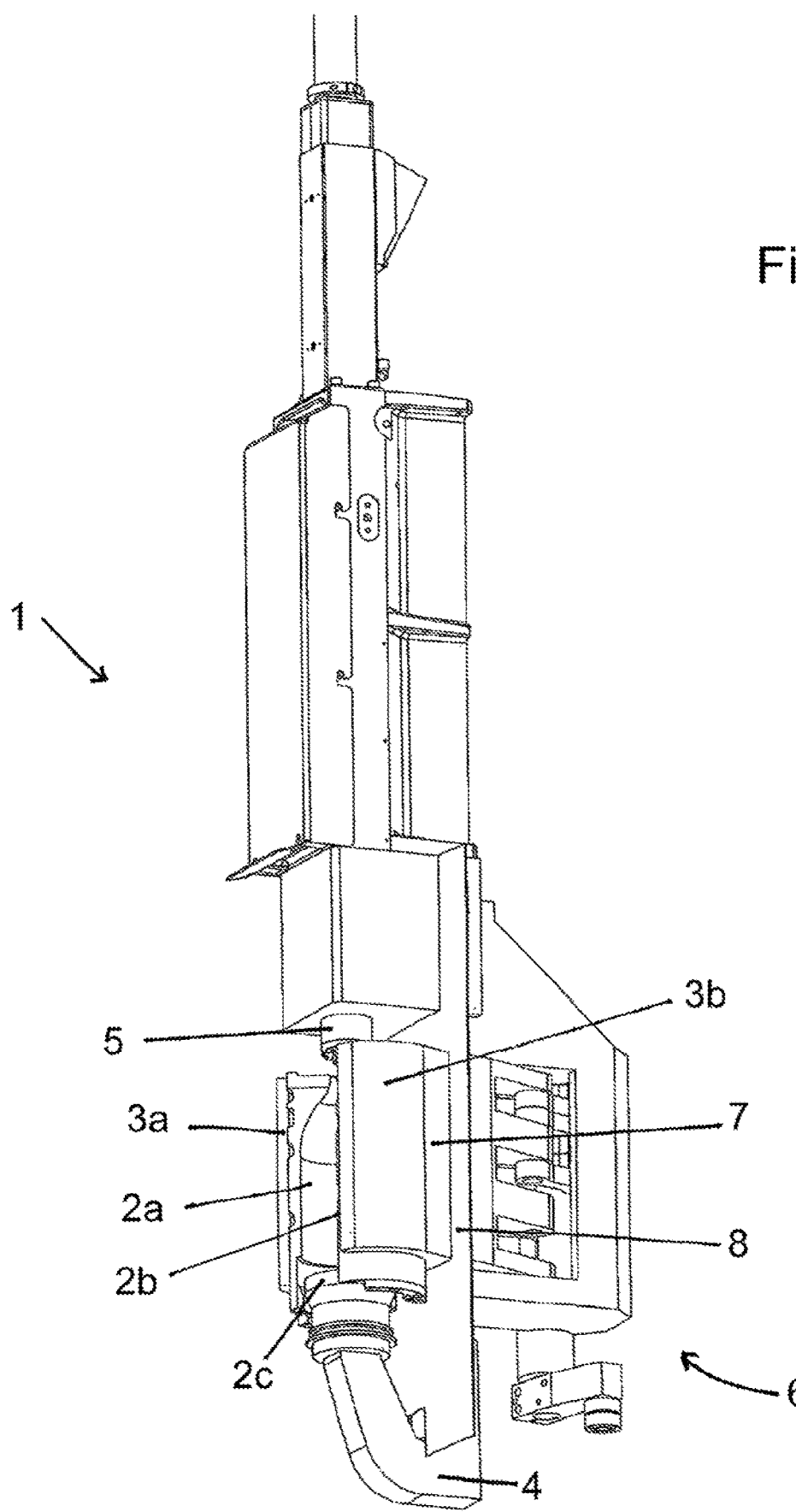
FIG. 1 shows a forming and filling station of an apparatus for simultaneously forming and filling containers from parisons with a mold carrier according to the invention in perspective view.

FIG. 1 shows a forming and filling station of a facility for simultaneously forming and filling bottles from parisons with an exemplary embodiment of a mold carrier according to the invention in perspective view.

The forming and filling station 1 comprises a mold consisting of three parts 2a, 2b and 2c, which comprises two vertically divided mold halves 2a and 2b, as well as a bottom-portion mold 2c. The mold halves 2a and 2b are arranged on a mold carrier 3a, 3b, which is divided vertically. The bottom portion 2c of the mold is arranged on an arm 4.

The parts 3a and 3b of the mold carrier are rotatably mounted about a vertical rotational axis, such that the two parts can be transitioned from an open position to a closed position. A bottle formed and filled in the closed position can be removed from the forming and filling station in the open position and can be transferred for further processing, such as on a stoppering or labeling wheel.

For this purpose, the filled bottle must be removed from the forming and filling head 5. This removal may result in droplet formation at the forming and filling head, such that filling product may be spilled in the mold area. Furthermore, it is possible in rare, exceptional cases for a parison to burst during the forming of the bottle, resulting in the spilling of filling product in the mold area. However, the mold is relatively easy to clean, requiring no elaborate disassembly. However, the actuating mechanism for opening and closing the mold is significantly more difficult to clean.

The drive mechanism 6 of the mold carrier according to the invention and the mold carrier itself therefore are mutually spaced horizontally and are connected by a connection region 7, which passes through a vertical separation plane, in which a protective wall 8 is arranged.

The protective wall 8 herein separates the mold area from the area of the drive mechanism 6, such that filling product spilled in the mold area may not enter the drive mechanism 6.

Figure 2A:
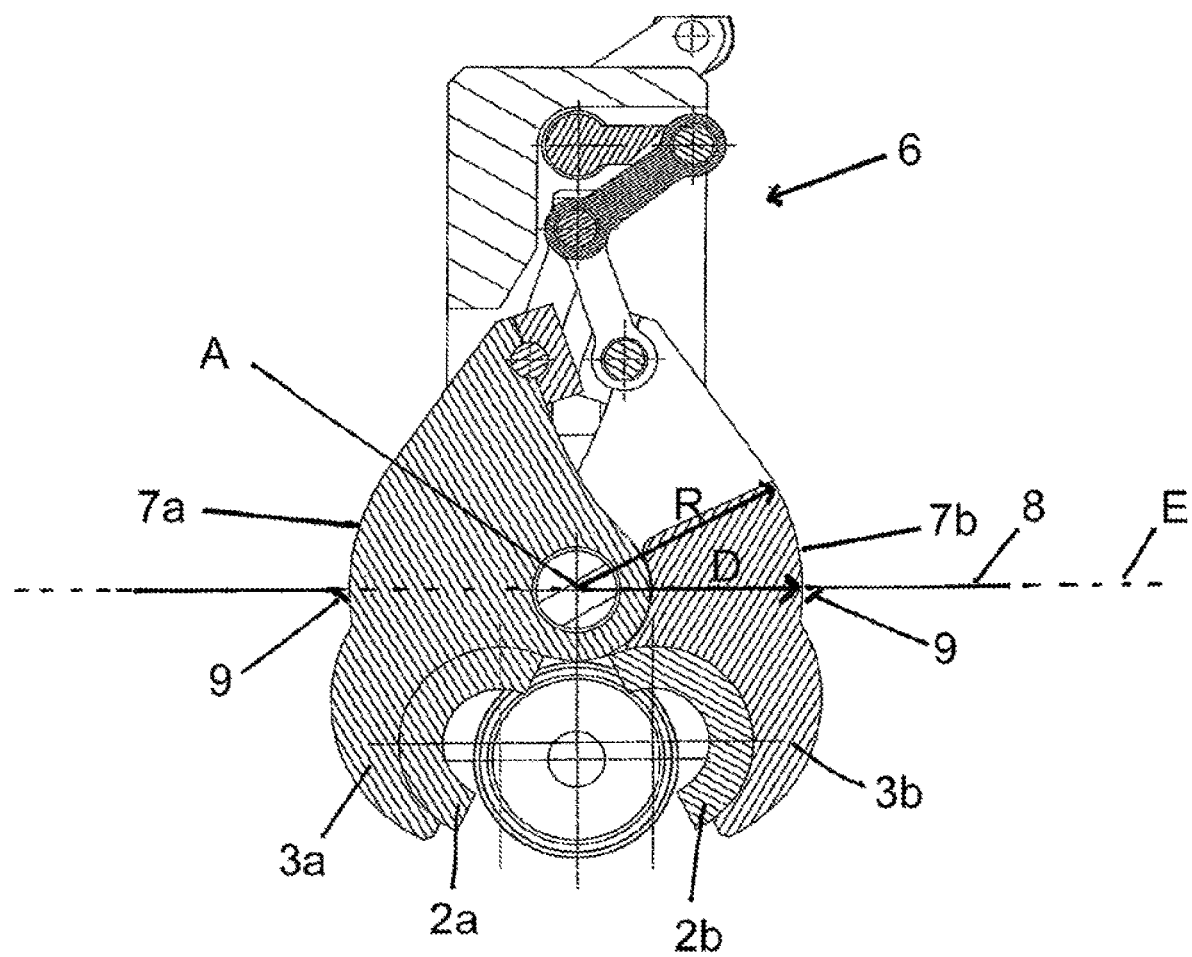
FIGS. 2A and 2B show a mold carrier according to the invention in partial cross-sectional view in a horizontal cross-section in its opened and closed positions.

FIG. 2A shows a mold carrier according to the invention in partial cross-sectional view in horizontal cross section in its open position. The mold halves 2a, 2b are mounted to the halves of the vertically divided mold carrier 3a, 3b. The halves 3a and 3b of the mold carrier are arranged such that they are rotatable about a rotational axis A via a drive mechanism 6.

The drive mechanism 6 herein is horizontally spaced apart from the mold carrier and is connected to the mold carrier by a connection region 7a, 7b. In the present exemplary embodiment, the mold carrier is located on one side of the rotational axis A and the drive mechanism 6 on the other side of that same axis.

The connection region passes through a vertical separation plane E, in which a protective wall 8 is arranged. The opening in the protective wall, which is required to allow the passage of the connection region 7a, 7b, seals the connection region liquid tight, such that no filling product can enter the drive mechanism 6 from the mold area.

The curvature radius R of the surfaces of the connection region 7a, 7b is advantageously designed in the exemplary embodiment shown here, such that it corresponds to the distance D of the surface from the rotational axis A of the respective half of the mold carrier 3a, 3b in any position of the mold carrier in the plane of the protective wall 8.

This design allows the surface to remain in the same position relative to the protective wall 8 during the rotational movement of the mold carrier while it opens and closes. The protective wall 8 therefore is able to seal tightly with the surface of the connection region 7a, 7b. A lip seal 9 is provided for this purpose, for example.

Figure 2B:
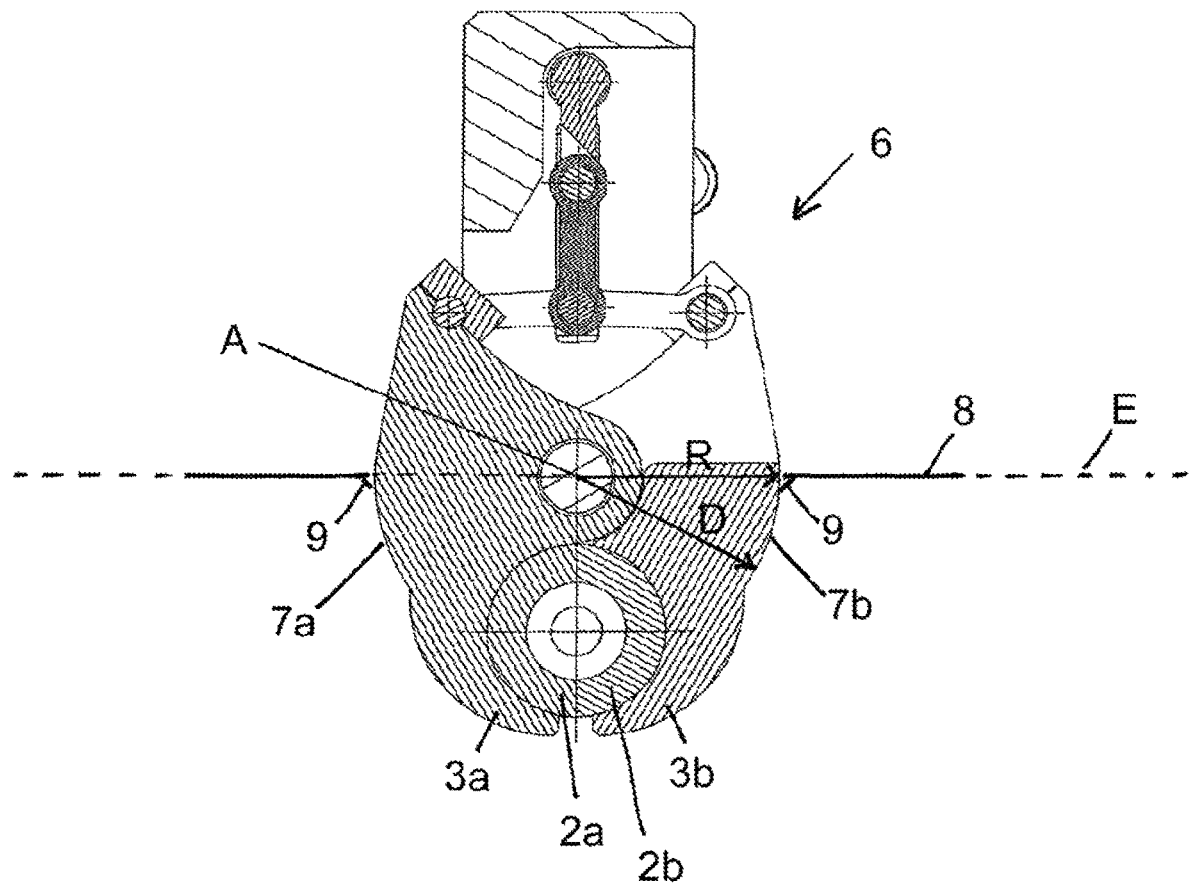

FIG. 2B shows the mold carrier from FIG. 2A in its closed position. It is readily apparent that the position of the surface of the connection region 7a, 7b has not changed relative to the protective wall 8 during the rotational movement of the mold carrier halves 3a, 3b, such that the lip seal 9 provides a reliable seal of the mold area against the drive mechanism 6.

The invention claimed is:

1. A device comprising:
 a mold carrier configured to receive mold sections for forming a hollow container from a parison through the introduction of a gaseous or liquid pressurized medium under pressure into the parison; and
 a drive mechanism;
 wherein the mold carrier is divided into a first part that includes a portion for holding one of the mold sections, and a second part that includes a portion for holding another of the mold sections,
 wherein the first part of the mold carrier is connected to the drive mechanism by a first part connection region,
 wherein the first part is supported such that it is rotatable by the drive mechanism about an axis of rotation such that the first part and the second part are transitionable between an open position and a closed position relative to each other, and
 wherein the first part connection region passes through a protective wall that is arranged between and separates the portion of the first part of the mold carrier for holding one of the mold sections and the portion of the second part of the mold carrier for holding another of the mold sections from the drive mechanism.

2. The device according to claim 1, wherein the second part is connected to the drive mechanism by a second part connection region, wherein the second part is supported such that it is rotatable by the drive mechanism about the axis of rotation of the first part, and wherein the second part connection region passes through the protective wall.

3. The device according to claim 1, wherein the second part is connected to the drive mechanism by a second part connection region, wherein the second part is rotatable by the drive mechanism about an axis of rotation that is separate from the axis of rotation of the first part, and wherein the second part connection region passes through the protective wall.

4. The device according to claim 1, wherein the protective wall bisects the axis of rotation of the first part.

5. The device according to claim 2, wherein the protective wall bisects the axis of rotation of the first part.

6. The device according to claim 3, wherein the protective wall bisects both the axis of rotation of the first part and the axis of rotation of the second part that is separate from the axis of rotation of the first part.

7. The device according to claim 1, wherein a liquid tight seal is formed between the protective wall and the first part connection region where the first part connection region passes through the protective wall.

8. The device according to claim 7 wherein the liquid tight seal is formed by an elastic bellows or a lip seal.

9. The device according to claim 1, wherein a surface of the first part connection region has a radius of curvature equal to a distance measured from the axis of rotation to the surface.

* * * * *